United States Patent
Faulstroh et al.

(10) Patent No.: US 6,585,294 B1
(45) Date of Patent: Jul. 1, 2003

(54) STEERING SHAFT

(75) Inventors: Hans-Joachim Faulstroh, Schmiechen (DE); Frank Schroeter, Moosburg (DE); Christoph Klukowski, Walenstadt (CH); Elmar Moch, Biel Bienne (CH); Matthias Renker, Hillertingen (CH); Matthias Hell, Biel Bienne (CH)

(73) Assignees: Bayerische Motoren Werke Aktiengesellschaft, Munich (DE); Krupp Presta AG, Eschen (LI)

( * ) Notice: Subject to any disclaimer, the term of this patent is extended or adjusted under 35 U.S.C. 154(b) by 0 days.

(21) Appl. No.: 09/787,236

(22) PCT Filed: Jul. 4, 2000

(86) PCT No.: PCT/EP00/06222
§ 371 (c)(1),
(2), (4) Date: Jul. 3, 2001

(87) PCT Pub. No.: WO01/05642
PCT Pub. Date: Jan. 25, 2001

(30) Foreign Application Priority Data

Jul. 16, 1999 (DE) .......................... 199 33 502

(51) Int. Cl.$^7$ .................................. B62D 1/16
(52) U.S. Cl. ........................... 280/777; 74/492
(58) Field of Search ................... 280/777; 74/492; 137/87, 68.13, 68.3

(56) References Cited

U.S. PATENT DOCUMENTS

| | | | | |
|---|---|---|---|---|
| 3,468,181 A | * | 9/1969 | Millar | 188/287 |
| 3,479,902 A | * | 11/1969 | Okamoto | 188/371 |
| 3,600,970 A | * | 8/1971 | Loofbourrow | 188/371 |
| 3,696,891 A | * | 10/1972 | Poe | 188/129 |
| 3,851,542 A | * | 12/1974 | Adams et al. | 188/376 |
| 3,949,623 A | * | 4/1976 | Fujiwara et al. | 74/492 |
| 4,255,986 A | * | 3/1981 | Mukoyama | 188/377 |
| 4,635,840 A | * | 1/1987 | Cenanovic | 228/107 |
| 4,991,871 A | * | 2/1991 | Sadakata | 280/777 |
| 5,342,091 A | * | 8/1994 | Hancock | 180/78 |
| 5,580,314 A | * | 12/1996 | Moriyama et al. | 280/777 |
| 5,618,058 A | * | 4/1997 | Byon | 280/777 |
| 5,685,565 A | * | 11/1997 | Schafer et al. | 280/777 |
| 5,893,580 A | * | 4/1999 | Hoagland et al. | 280/731 |
| 5,941,562 A | * | 8/1999 | Rink et al. | 280/737 |
| 6,010,152 A | * | 1/2000 | Swann et al. | 280/736 |

FOREIGN PATENT DOCUMENTS

| | | | | |
|---|---|---|---|---|
| DE | 2548020 | | 4/1976 | |
| FR | 2572338 A | * | 5/1986 | B60G/13/06 |

\* cited by examiner

Primary Examiner—Brian L. Johnson
Assistant Examiner—Kelly E Campbell
(74) Attorney, Agent, or Firm—Crowell & Moring LLP

(57) ABSTRACT

A steering spindle (1) has a thin-walled container (5) which is filled by an incompressible flowable material (7). In the event of a crash, the container (5) is opened up by means of a, for example, pyrotechnic device (13). As a result, the flowable material (7) emerges and the container (5) deforms, whereby the forward vehicle intrusion is uncoupled from the behavior of the steering column.

20 Claims, 2 Drawing Sheets

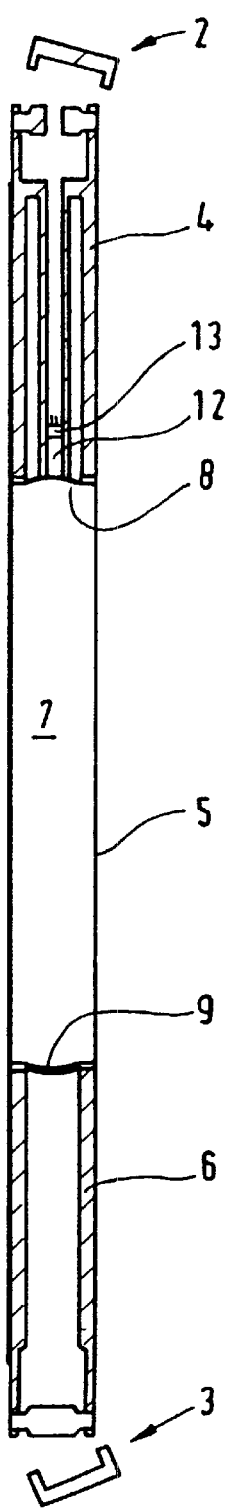
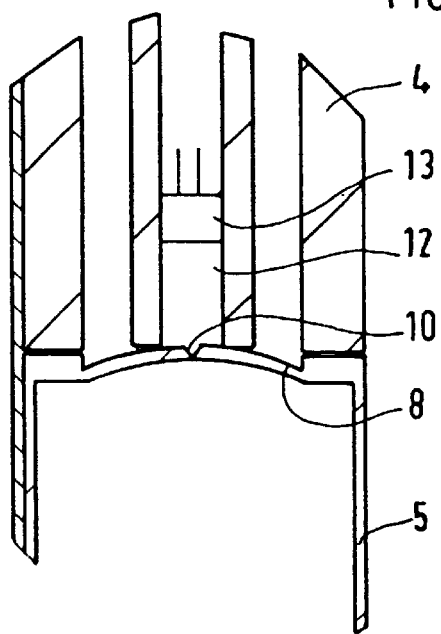
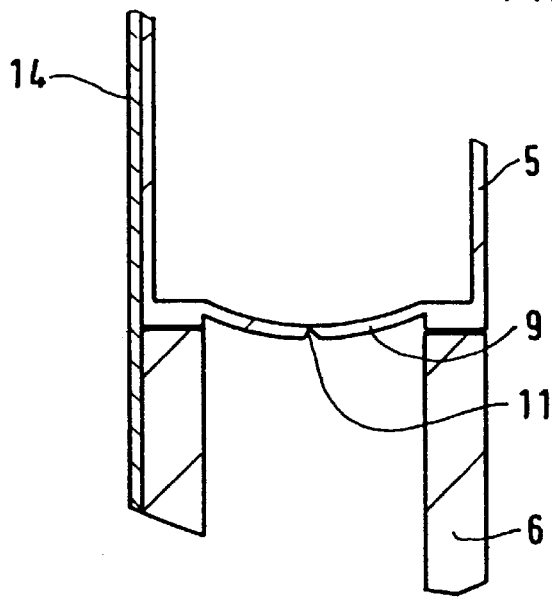

STEERING SHAFT

BACKGROUND AND SUMMARY OF THE INVENTION

The invention relates to a steering spindle having a section which can be deformed in the event of a crash.

In order to, in the event of a crash, uncouple the movement of the steering gear to the driver caused by the forward vehicle intrusion from the behavior of the steering column with respect to the driver, it is known to equip the steering spindle with a section which deforms in the event of a crash.

For this purpose, a portion of the steering spindle can be formed by a corrugated tube; the steering spindle can have a forward-bent desired bending point; or a bendable shaft or a flexible metal tube can be provided. In addition, for uncoupling the forward vehicle intrusion from the steering column behavior, a swinging arm or a shear element with a shearing surface which is oblique with respect to the steering spindle can be integrated in the steering spindle or the steering spindle can be constructed to be telescopable.

While the corrugated tube and the desired bending point require a high level of force for the deformation and, in the case of bendable shafts and flexible metal tubes, the resistance is unsatisfactory, the telescopable steering spindle has an optimal function only in the case of an axial introduction of force which, however, in the event of a crash, is improbable. In the case of the shear element, it is a disadvantage that, even at a low safety level, for example, in the event of a shocklike loading of a steered wheel, for example, in the off-road operation, a shearing can take place. The disadvantage of the swinging arm is mainly its large space and clearance requirement.

It is an object of the invention to provide a steering spindle with a low requirement with respect to space and clearance and with a high resistance to torsion which, at a low level of force and independently of the force introduction direction, ensures a perfect uncoupling of the forward vehicle intrusion from the steering column behavior in the event of a crash.

According to the invention, this is achieved by means of a steering spindle which can deform in the event of a crash, wherein a deformable section is formed by a thin-walled container filled with an incompressible flowable material, and a device for opening the container in the event of a crash is provided. Advantageous further developments of the steering spindle according to the invention are indicated in the subclaims.

According to the invention, an axial section of the steering spindle consists of a thin-walled container which is filled with an incompressible flowable material. The container consists, for example, of a metal sheet or a similar deformable thin-wall material.

Like a closed can filled with a liquid, in the closed condition, the container has a high resistance to torsion while, after the opening, while the flowable material emerges, like an opened can, it can easily be twisted and/or compressed.

So that, in the event of a crash, the flowable material can flow out of the container, the steering spindle according to the invention is provided with a device by which the container is opened in the event of a crash.

This device can have different constructions. Thus, an electromagnetic device can be provided for opening the container, such as a solenoid valve or similar shut-off element which, in the event of a crash, is actuated by way of an analysis unit by a crash sensor. In addition, for example, a mechanical device for opening the container can be provided, such as a point, blade or similar penetrating element, which is arranged on the side of a part connected with the steering gear, which side faces the container, which part is displaceably guided with respect to the container, for example, telescopically in a steering spindle section connected with the container. The penetrating element therefore penetrates into one face of the container, whereby immediately at the start of the crash, the forward vehicle intrusion can be uncoupled from the steering column behavior by a deformation of the container. It is also conceivable that the device for opening the container only begins to tear or slits open the latter without penetrating into the interior of the container.

In addition, a pyrotechnic device can be provided for opening the container, which device is ignited by way of an analysis unit by a crash sensor. The analysis unit can define, for example, the safety level and the point in time for initiating the pyrotechnic charge and thus for deforming the container. In the case of a slight crash, the steering capacity can therefore be maintained.

The pyrotechnic device can be formed by a pyrotechnic charge in the interior of the container, which charge, after its ignition by increasing the internal pressure of the container results in the opening of the container. On a face of the container, a pressure chamber with the pyrotechnic charge can also be provided, the flowable material in the container flowing out, for example, on the opposite face of the container.

In order to facilitate the opening of the container and therefore the flowing-out of the flowable material, the faces of the container are preferably provided with a bursting foil or similar desired breaking points.

The pyrotechnic device for opening the container can also be formed by a piston in a cylinder which can be acted upon by the combustion gases of the pyrotechnic charge, the piston being provided with a point or similar penetrating element for opening the container.

The incompressible flowable material in the container can be a liquid, such as water or oil, for example, mineral oil or silicone oil. Firm incompressible, flowable materials can also be used. Combinations of incompressible liquids and solid-state materials are also conceivable.

So that it can flow out of the opening in the container with a low force requirement and at a high speed, the incompressible flowable material must, however, have a slight cohesive resistance. Also, for reasons of weight, light materials are preferred, such as mixtures of liquids and light fillers, particularly hollow microballs, for example, made of glass or plastic.

As a result of the container integrated in the steering spindle according to the invention, in the event of a crash, a secure uncoupling of the forward vehicle intrusion from the steering column behavior is achieved at a low level of force.

Because of its filling with the incompressible flowable material, the container has a rigidity in the driving area which ensures a perfect torque transmission while the elasticity of torsion is minimal.

The container, which is arranged coaxially with respect to the steering spindle, may have a diameter corresponding to the steering spindle, so that no additional space or clearance is required. The function of the steering spindle according to the invention is also independent of the direction of the introduction of force because the opened container will also collapse perfectly at lateral forces.

In order to protect the container and minimize the consequences of a faulty triggering, the steering spindle can have a protective covering, for example, consisting of a woven metallic or synthetic structure, a fiber-reinforced synthetic material or the like, in the area of the container, which protective covering surrounds the container and connects the steering spindle sections with one another which are separated by the container. As a result, the steerability is maintained, although with an increased elasticity, to such an extent that the steering of the vehicle can continue at least to a coasting.

In the following, an embodiment of the steering spindle according to the invention will be explained in detail by means of a drawing.

BRIEF DESCRIPTION OF THE DRAWINGS

FIG. 2 is a schematic sectional view of the steering spindle according to FIG. 1; and FIGS. 3 and 4 are enlarged views of the upper and lower area of the container integrated in the steering spindle and filled with an incompressible flowable material.

DETAILED DESCRIPTION OF THE DRAWINGS

Figure 1:
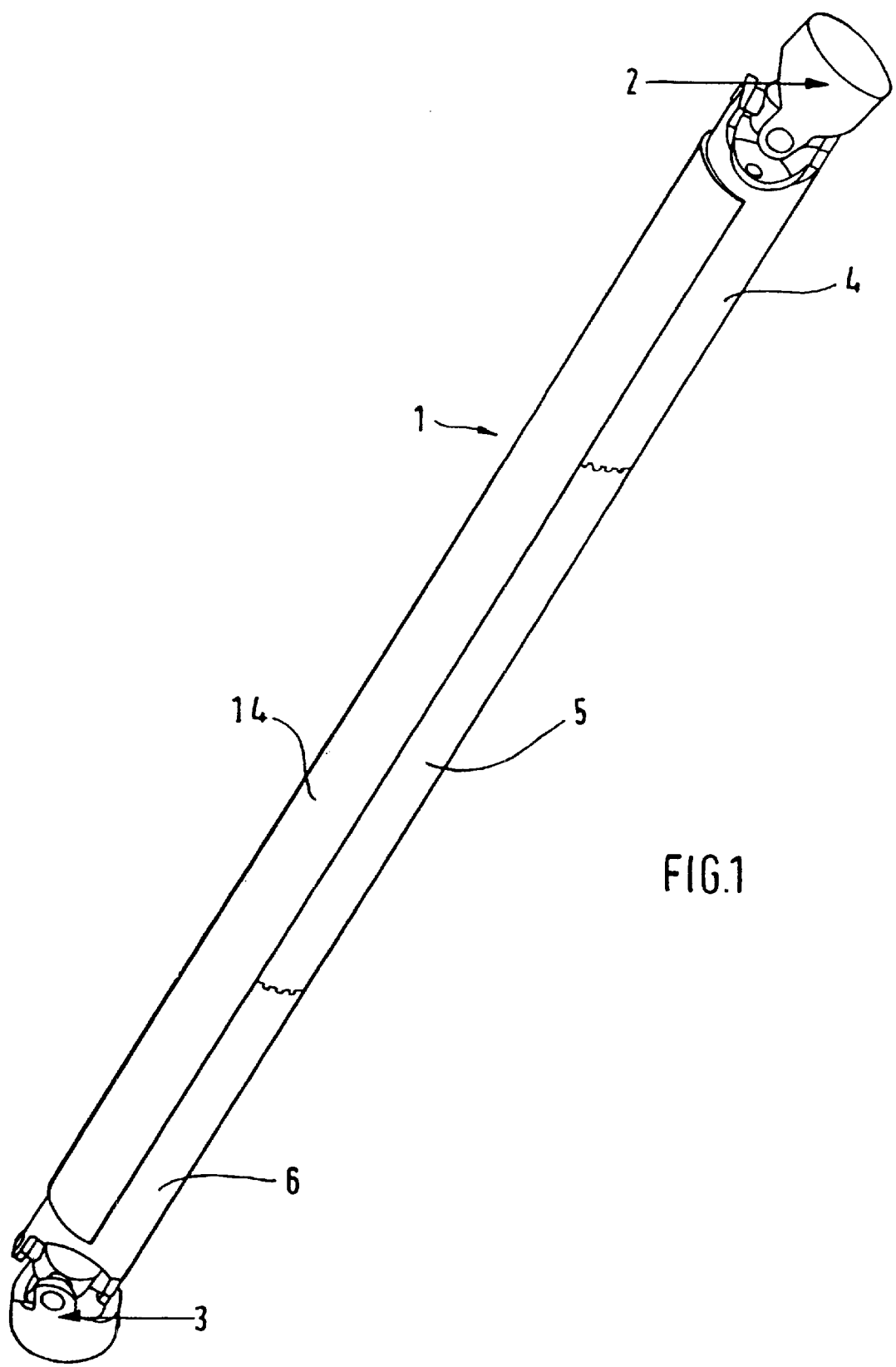
FIG. 1 is a perspective view of a steering spindle with a partially removed protective covering.

According to FIG. 1, a steering spindle 1 has an upper cardan joint 2 to which the steering wheel, which is not shown, is connected, as well as a lower cardan joint 3 to which the steering gear is connected, which is not shown.

The steering spindle 1 consists of a thick-walled upper tube-shaped section 4 with the upper cardan joint 2 and of a thick-walled lower tube-shaped section 6 with the cardan joint 3. Between the upper section 4 and the lower section 6, a cylindrical container 5 is arranged which has a thin-walled circumferential wall, for example, made of sheet metal.

The container 5 is completely filled with an incompressible flowable material 7, such as silicone oil, which, for reducing the weight, can contain a large fraction of hollow micro glass balls.

The container 5 can be connected with the upper and the lower section 4 and 6, for example, by a material closure, such as gluing or welding, or by a form closure, for example, by the construction as an external polygon in the upper and lower edge area and the construction of the upper and lower tube-shaped section 4 and 6 in the connection area as a corresponding internal polygon.

The upper and the lower front wall 8 and 9 of the container 5 is provided with a desired breaking point 10 and 11. The upper front wall 8, in the area of the desired breaking point 10, simultaneously closes off a pressure chamber in the upper steering spindle section 4, in which a primer capsule or similar pyrotechnic charge 13 is arranged which is electrically ignited by an analysis unit, which is not shown and which is controlled by a crash sensor which is not shown.

During the ignition of the pyrotechnic charge 13 in the event of a crash, the desired breaking points 10 and 11 in the front wall 8 and 9 will tear open as a result of the pressure in the pressure chamber 12, whereby the material 7 in the container 5 emerges by way of the torn-open lower front wall 9 into the lower section 6 of the steering spindle 1.

Whereas the container 5 filled with the material 7 provides the steering spindle 1 with the rigidity required for the torque transmission, while the elasticity is minimal, the container 5 collapses in the event of a crash by the emerging of the material 7. As a result of the deformation of the container 5, the forward vehicle intrusion is uncoupled from the steering column behavior while the level of force is low.

The steering spindle 1 is surrounded by a thin-walled 14 protective covering 14 which connects the upper section 4 with the lower section 6.

What is claimed is:

1. Steering spindle comprising a section including a thin-walled container, wherein during normal steering operation the container is filled with an incompressible flowable material so that the container is sufficiently rigid to transmit a steering torque from a steering handle, wherein in the event of a crash, the container is opened to discharge the incompressible flowable material so that the container is deformable to allow the steering spindle to deform, the steering spindle further comprising a device for opening the container to allow the incompressible flowable material to be discharged from the container in the event of a crash.

2. Steering spindle according to claim 1,
wherein one of a pyrotechnic, mechanical and electro-magnetic device for opening the container is provided.

3. Steering spindle according to claim 2,
wherein the container has a desired breaking point for opening the container on at least one front side.

4. Steering spindle according to claim 2,
wherein the incompressible flowable material is formed by a mixture of a liquid and a solid-state material.

5. Steering spindle according to claim 2,
wherein in the area of the container, a protective covering is provided which connects the steering spindle sections with one another which are separated by the container.

6. Steering spindle according to claim 1,
wherein the container has a desired breaking point for opening the container on at least one front side.

7. Steering spindle according to claim 6,
wherein the incompressible flowable material is formed by a mixture of a liquid and a solid-state material.

8. Steering spindle according to claim 6,
wherein in the area of the container, a protective covering is provided which connects the steering spindle sections with one another which are separated by the container.

9. Steering spindle according to claim 1,
wherein the incompressible flowable material is formed by a mixture of a liquid and a solid-state material.

10. Steering spindle according to claim 9,
wherein in the area of the container, a protective covering is provided which connects the steering spindle sections with one another which are separated by the container.

11. Steering spindle according to claim 1,
wherein in the area of the container, a protective covering is provided which connects the steering spindle sections with one another which are separated by the container.

12. Steering spindle assembly comprising:
an upper section connectable with a steering wheel,
an intermediate section joining the upper section,
said intermediate section being formed as a thin walled container filled with an incompressible flowable material so that the container is sufficiently rigid to transmit a steering torque from a steering handle,
a lower section joining the intermediate section and connectable with a steering gear, and container opening means for opening the container in an event of a crash whereby the intermediate section becomes deformable thereby protecting the vehicle driver from transfer of collision forces through the steering spindle assembly.

13. Steering spindle assembly according to claim 12, wherein the container opening means include pyrotechnic means.

14. Steering spindle assembly according to claim 12, wherein said intermediate section is formed as a sheet metal tubular section.

15. Steering spindle assembly according to claim 12, wherein the container opening means includes a solenoid valve.

16. Steering spindle assembly according to claim 12, wherein the container opening means include a container penetrating element.

17. Steering spindle assembly according to claim 12, wherein at least one end face of the intermediate section includes a bursting foil which is burst by the container opening means.

18. Steering spindle assembly according to claim 12, wherein the upper and lower sections are respective thick walled tubular sections and the intermediate section is a thin walled tubular section.

19. Steering spindle assembly according to claim 12, wherein the incompressible flowable material includes silicon oil containing hollow micro glass balls.

20. A method of making a steering spindle assembly comprising:

forming an upper section connectable with a steering wheel, joining an intermediate section to the upper section, said intermediate section being formed as a thin walled container filled with an incompressible flowable material so that the container is sufficiently rigid to transmit a steering torque from a steering handle, joining a lower section to the intermediate section, said lower section being connectable with a steering gear, wherein said thin walled container of the intermediate section is configured to be opened to release the flowable material in the event of collision forces in use on the steering spindle assembly so that the container becomes deformable to allow the steering spindle assembly to collapse.

* * * * *